United States Patent
Torvi et al.

(10) Patent No.: US 10,291,531 B2
(45) Date of Patent: May 14, 2019

(54) BANDWIDTH MANAGEMENT FOR RESOURCE RESERVATION PROTOCOL LSPS AND NON-RESOURCE RESERVATION PROTOCOL LSPS

(71) Applicant: Juniper Networks, Inc., Sunnyvale, CA (US)

(72) Inventors: Raveendra Torvi, Nashua, NH (US); Harish Sitaraman, Cupertino, CA (US); Vishnu Pavan Beeram, Ashburn, VA (US); Shraddha Hegde, Bangalore (IN); Chandrasekar Ramachandran, Bangalore (IN); Sudharsana Venkataraman, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 93 days.

(21) Appl. No.: 15/199,159

(22) Filed: Jun. 30, 2016

(65) Prior Publication Data

US 2018/0006948 A1 Jan. 4, 2018

(51) Int. Cl.
*H04L 12/803* (2013.01)
*H04L 12/24* (2006.01)
(Continued)

(52) U.S. Cl.
CPC ........ *H04L 47/125* (2013.01); *H04L 41/0896* (2013.01); *H04L 43/0882* (2013.01);
(Continued)

(58) Field of Classification Search
CPC ... H04L 47/125; H04L 41/0896; H04L 43/16; H04L 43/0894; H04L 45/50
See application file for complete search history.

(56) References Cited

U.S. PATENT DOCUMENTS 6,363,319 B1 * 3/2002 Hsu .................. H04L 45/00
701/533
6,493,317 B1 * 12/2002 Ma .................... H04L 47/10
370/237
(Continued)

FOREIGN PATENT DOCUMENTS

EP 2224649 A1 9/2010
EP 2658192 A1 10/2013

OTHER PUBLICATIONS

Awduche et al., "RSVP-TE: Extensions to RSVP for LSP Tunnels," RFC 3209, Network Working Group, Dec. 2001, 61 pp.
(Continued)

*Primary Examiner* — Steven H Nguyen
(74) *Attorney, Agent, or Firm* — Shumaker & Sieffert, P.A.

(57) ABSTRACT

In general, techniques described are for bandwidth sharing between resource reservation protocol label switched paths (LSPs) and non-resource reservation protocol LSPs. For example, in networks where resource reservation protocol LSPs and non-resource reservation protocol LSPs co-exist within the same domain, resource reservation protocol LSPs and non-resource reservation protocol LSPs may share link bandwidth. However, when non-resource reservation protocol LSPs are provisioned, resource reservation protocol path computation elements computing resource reservation protocol paths may not account for non-resource reservation protocol LSP bandwidth utilization. The techniques described herein provide a mechanism for automatically updating traffic engineering database (TED) information about resource reservation protocol LSPs in a way that accounts for non-resource reservation protocol LSP traffic flow statistics, such as bandwidth utilization. Path compu-
(Continued)

tation elements may thus rely on an accurate TED for LSP path computation.

28 Claims, 4 Drawing Sheets

(51) Int. Cl.
*H04L 12/26* (2006.01)
*H04L 12/723* (2013.01)
*H04L 12/801* (2013.01)
*H04L 12/911* (2013.01)

(52) U.S. Cl.
CPC .......... *H04L 43/0894* (2013.01); *H04L 43/16* (2013.01); *H04L 45/50* (2013.01); *H04L 47/11* (2013.01); *H04L 47/822* (2013.01)

(56) References Cited

U.S. PATENT DOCUMENTS

| | | | | |
|---|---|---|---|---|
| 7,948,986 | B1* | 5/2011 | Ghosh | H04L 45/50 370/392 |
| 8,000,327 | B1* | 8/2011 | Minei | H04L 45/50 370/392 |
| 8,171,162 | B2* | 5/2012 | Sheth | H04L 65/00 709/242 |
| 8,189,476 | B1* | 5/2012 | Rothstein | H04L 47/127 370/235 |
| 8,787,400 | B1* | 7/2014 | Barth | H04L 45/24 370/419 |
| 9,699,116 | B2* | 7/2017 | Zhang | H04L 49/35 |
| 2009/0003217 | A1* | 1/2009 | Ferra | H04L 41/0853 370/238 |
| 2011/0276679 | A1* | 11/2011 | Newton | H04N 21/23103 709/224 |
| 2012/0134260 | A1* | 5/2012 | Chou | H04L 43/065 370/225 |
| 2013/0155865 | A1* | 6/2013 | Xu | H04L 43/0894 370/237 |
| 2013/0235731 | A1* | 9/2013 | Hadinata | H04L 65/1083 370/241 |
| 2013/0286846 | A1* | 10/2013 | Atlas | H04L 45/34 370/236 |
| 2014/0233587 | A1* | 8/2014 | Liu | H04L 47/782 370/468 |
| 2015/0063802 | A1* | 3/2015 | Bahadur | H04L 47/125 398/49 |
| 2015/0281976 | A1* | 10/2015 | Riesenberg | H04W 16/18 455/446 |
| 2016/0277290 | A1* | 9/2016 | Sivabalan | H04L 45/50 |
| 2017/0149685 | A1* | 5/2017 | Wu | H04L 47/724 |

OTHER PUBLICATIONS

Filsfils et al., "Segment Routing Architecture," Network Working Group Internet Draft Update: draft-filsfils-rtgwg-segment-routing-00, Jun. 28, 2013, 28 pp.
Filsfils et al., "Segment Routing Use Cases," Network Working Group Internet Draft Update: draft-filsfils-rtgwg-segment-routing-use-cases-01, Jul. 14, 2013, 46 pp.
MOY, "OSPF Version 2," RFC 2328, Network Working Group, Apr. 1998, 197 pp.
Coltun et al., "OSPF for IPv6," RFC 5340, Network Working Group, Jul. 2008, 94 pp.
Sheth et al., "OSPF Hybrid Broadcast and Point-to-Multipoint Interface Type," RFC 6845, Internet Engineering Task Force (IETF), Jan. 2013, 9 pp.
Lindem et al., "OSPFv3 LSA Extendibility," Network Working Group Internet Draft: draft-acee-ospfv3-lsa-extend-01.txt, Jul. 15, 2013, 27 pp.
Oran, "OSI IS-IS Intra-domain Routing Protocol," RFC 1142, Network Working Group, Feb. 1990, 157 pp.
Li et al, "IGP Requirements for Traffic Engineering with MPLS," Network Working Group Internet Draft, draft-li-mpls-igp-te-00.txt, Feb. 1999, 6 pp.
Andersson et al., "LDP Specification," RFC 3036, Network Working Group, Jan. 2001, 132 pp.
Sitaraman et al., "Recommendations for RSVP-TE and Segment Routing LSP co-existence, draft-ieff-teas-sr-rsvp-coexistence-rec-01.txt," TEAS Working Group, Internet-Draft, Jun. 28, 2017, 11 pp.
Le Faucheur, "Russian Dolls Bandwidth Constraints Model for Diffserv-aware MPLS Traffic Engineering," RFC 4127, Network Working Group, Jun. 2005, 13 pp.
Extended Search Report from counterpart European Application No. 17178828.4, dated Oct. 26, 2017, 12 pp.
Response filed Jul. 3, 2018 to the Extended Search Report from counterpart European Application No. 17178828.4, dated Oct. 26, 2017, 10 pp.

\* cited by examiner

BANDWIDTH MANAGEMENT FOR RESOURCE RESERVATION PROTOCOL LSPS AND NON-RESOURCE RESERVATION PROTOCOL LSPS

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area. The contents of a Link State Database (LSDB) or a Traffic Engineering Database (TED) maintained in accordance with a link state routing protocol only have the scope of an IGP area. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages so as to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Distributed or centralized path computation element may compute paths to establish an LSP. However, path computation elements lack knowledge of co-existing paths of different LSPs in the same domain. Typically, the co-existence of LSPs in the same domain introduces inaccuracies in the TED used by the path computation elements, thereby requiring a change in the computation logic.

SUMMARY

In general, techniques described are for bandwidth sharing between resource reservation protocol label switched paths (LSPs) and non-resource reservation protocol LSPs. For example, in networks where resource reservation protocol LSPs and non-resource reservation protocol LSPs co-exist within the same domain, resource reservation protocol LSPs and non-resource reservation protocol LSPs may share link bandwidth. However, when non-resource reservation protocol LSPs are provisioned, resource reservation protocol path computation elements computing resource reservation protocol paths may not account for non-resource reservation protocol LSP bandwidth utilization. The techniques described herein provide a mechanism for automatically updating traffic engineering database (TED) information about resource reservation protocol LSPs in a way that accounts for non-resource reservation protocol LSP traffic flow statistics, such as bandwidth utilization. Path computation elements may thus rely on an accurate TED for LSP path computation.

For example, the techniques may include collecting traffic flow statistics forwarded on a non-resource reservation protocol label switched path (LSP) over an interface of an ingress network device to the non-resource reservation protocol LSP. The techniques may also include computing an average of the collected traffic flow statistics. The techniques may further include comparing the traffic flow statistics to a pre-defined threshold. The techniques may also include automatically adjusting a percentage of reservable bandwidth available for resource reservation protocol LSP reservations for the interface of the ingress network device if the amount of network traffic has met the pre-defined threshold for the interface.

In one example, a method includes comparing, by a network device and to a pre-defined threshold, traffic flow statistics indicating an amount of network traffic forwarded on a non-resource reservation protocol label switched path (LSP) over an interface of an ingress network device to the non-resource reservation protocol LSP. The method also includes, in response to determining the amount of network traffic has met the pre-defined threshold for the interface, automatically adjusting, by the network device, a percentage of reservable bandwidth available for resource reservation protocol LSP reservations for the interface of the ingress network device.

In another example, a router includes at least one processor coupled to a memory, wherein the processor executes software configured to compare, to a pre-defined threshold, traffic flow statistics indicating an amount of network traffic forwarded on a non-resource reservation protocol label switched path (LSP) over an interface of the router to the non-resource reservation protocol LSP. The router further includes software configured to, in response to determining the amount of network traffic has met the pre-defined threshold for the interface, automatically adjust a percentage of reservable bandwidth available for resource reservation protocol LSP reservations for the interface of the router.

In another example, a controller includes at least one processor coupled to a memory, wherein the processor executes software configured to compare, to a pre-defined threshold, traffic flow statistics indicating an amount of network traffic forwarded on a non-resource reservation protocol label switched path (LSP) over an interface of an ingress network device to the non-resource reservation protocol LSP. The controller further includes software configured to, in response to determining the amount of network traffic has met the pre-defined threshold for the interface, automatically adjust a percentage of reservable bandwidth available for resource reservation protocol LSP reservations for the interface of the ingress network device.

In another example, a computer-readable medium includes instructions for causing at least one programmable processor of a network device to compare, to a pre-defined threshold, traffic flow statistics indicating an amount of network traffic forwarded on a non-resource reservation protocol label switched path (LSP) over an interface of an ingress network device to the non-resource reservation protocol LSP. The computer-readable medium further includes instructions to, in response to determining the amount of network traffic has met the pre-defined threshold for the interface, automatically adjust a percentage of reservable bandwidth available for resource reservation protocol LSP reservations for the interface of the ingress network device.

The details of one or more examples are set forth in the accompanying drawings and the description below. Other features, objects, and advantages will be apparent from the description and drawings, and from the claims.

DETAILED DESCRIPTION

Figure 1:
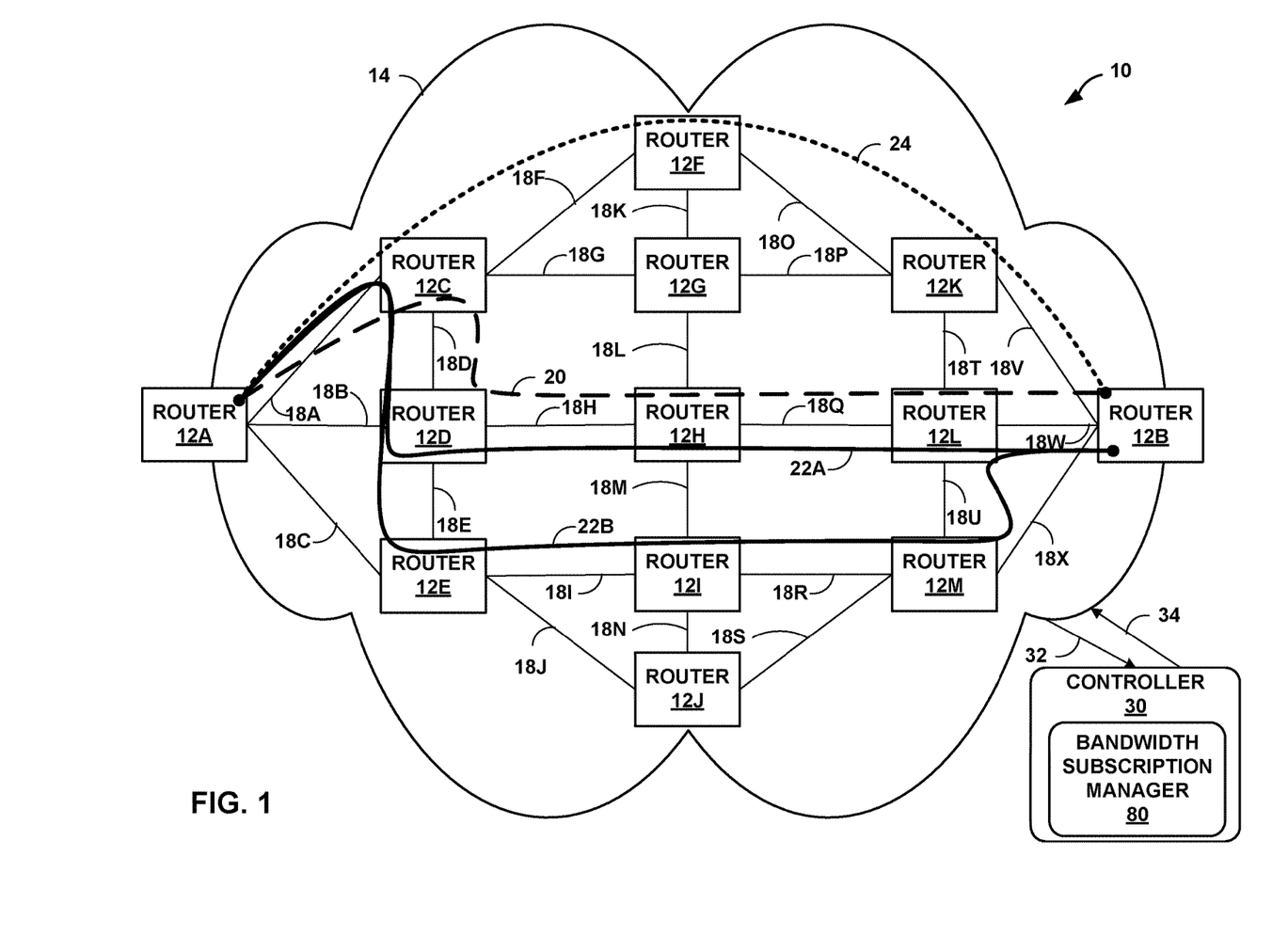
FIG. 1 is a block diagram illustrating an example computer network having a plurality of different LSPs established over the network between an ingress router and an egress router.

FIG. 1 is a block diagram illustrating a system 10 that includes an example computer network 14 having a plurality of different Label Switched Paths (LSPs) established over the network 14 between an ingress router 12A and an egress router 12B. Network 14 may include routers 12A-12M ("routers 12") to establish a plurality of LSPs, including resource reservation protocol and non-resource reservation protocol LSPs. Resource reservation protocol LSPs are LSPs established by sending signaling messages that request reservation of a specified amount of bandwidth for the LSPs. The term non-resource reservation protocol LSPs, as used herein, refers to LSPs that are not established by sending signaling messages that request reservation of a specified amount of bandwidth for the LSPs.

For illustrative purposes, routers 12 may use a resource reservation protocol such as the Resource Reservation Protocol with Traffic Engineering extensions (RSVP-TE) to establish RSVP-TE LSPs, such as RSVP-TE LSP 22A, 22B (collectively, RSVP-TE LSPs 22") that extend from ingress router 12A to egress router 12B. Routers 12 may also use non-resource reservation protocol mechanisms, e.g., non-RSVP mechanisms such as segment routing techniques and/or the Label Distribution Protocol (LDP), for establishing non-resource reservation protocol LSPs, such as segment routing LSP 20 and/or LDP LSP 24 that extend from ingress router 12A to egress router 12B, for example. In the example of FIG. 1, segment routing LSP 20, LDP LSP 24, and RSVP-TE LSPs 22 are established across one or more of links 18A-18X ("links 18") using segment routing techniques, LDP protocol, and RSVP-TE protocol, respectively. Although the example of FIG. 1 is shown with SR LSP and LDP LSP, routers 12 may use other non-resource reservation protocols (e.g., the Border Gateway Protocol Labeled Unicast (BGP-LU)) and/or static LSPs to establish a non-resource reservation protocol LSP.

The sources of the network traffic received by ingress router 12A may comprise one or more devices (not shown) and/or any public or private network or the Internet that provides traffic to ingress router 12A in network 14. The destinations of the network traffic being forwarded on non-resource reservation protocol LSPs and resource reservation protocol LSPs may comprise one or more destination devices and/or network that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

In some examples, ingress router 12A may use the RSVP-TE protocol to compute available paths from ingress router 12A to egress router 12B that satisfy certain constraints on RSVP-TE LSPs 22 imposed by the network administrator. For example, ingress router 12A may establish multiprotocol label switching (MPLS) transport LSPs based on constraint information about links 18 within network 14 including, for example, reserved bandwidth availability, link color, Shared Risk Link Group (SRLG), and the like. RSVP-TE may use reserved bandwidth availability information accumulated by route advertisements from a link-state interior gateway protocol (IGP), such as the Intermediate System-Intermediate System (ISIS) protocol or the Open Shortest Path First (OSPF) protocol to configure RSVP-TE LSPs 22A, 22B. After computing the multiple paths, RSVP-TE may select one of the computed paths and send a Path message for establishing one of RSVP-TE LSPs 22 along the selected path. RSVP-TE establishes LSPs that follow a single path from ingress router 12A to egress router 12B, and all network traffic sent on the LSP must follow exactly that single path. Further examples of RSVP-TE are described in D. Awduche et. al, "RSVP-TE: Extensions to RSVP for LSP Tunnels," Request for Comments 3209, December 2001, the entire contents being incorporated by reference herein.

In some examples, ingress router 12A uses segment routing techniques to configure labels for paths from ingress router 12A to egress router 12B. Segment routing within an IGP domain (e.g., network 14) allows routers to advertise single or multi-hop LSPs within the IGP domain such as segment routing LSP 20. For segment routing, the "path" information is disseminated between the routers as part of the IGP link state information for the domain. Routers are able to steer packets through a controlled set of instructions, called segments, by prepending a segment routing header (e.g., label) to the packets. Segment routing allows routers to enforce a flow through any topological path and service chain while maintaining per-flow state only at the ingress node to the segment routing domain. One potential advantage of segment routing may be that the segment routing architecture can be directly applied to the MPLS data plane with no change in the forwarding plane. A network operator need only allocate one node segment per router and the segment routing IGP control-plane automatically builds the required MPLS forwarding constructs from any router to any other router.

In general, a network device, such as a router, using a link-state routing protocol within a routing domain (e.g., an IGP routing domain) typically maintains one or more link state databases (LSDBs) for storing link-state information about nodes, links and paths within a given area referred to as the routing domain. Attributes of a "path" stored in these traffic engineering databases (TED) for an IGP domain typically include: head-end/tail-end IP addresses for the path, a list of explicit route objects (EROs), a backup ERO list, a list of supported hop-by-hop algorithms, and hop-by-hop label ranges. Segment Routing utilizes this information within an IGP domain to advertise path information as part of the link-state IGP information that is flooded throughout the IGP domain so as to support path-based packet steering. Segment Routing is further described in Filsfils et. al., "Segment Routing Architecture," Internet-Draft draft-fils-fils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each being incorporated herein by reference.

In some examples, operators of network 14 may want to migrate from using resource reservation protocol LSPs, such as RSVP-TE LSPs 22, to using non-resource reservation protocol LSPs, such as segment routing LSP 20 or LDP LSP 24 (collectively, "non-RSVP LSPs"). In some cases, the migration process may take years such that resource reservation protocol LSPs and non-resource reservation protocol LSPs co-exist within the same network domain during this transition period. As more non-resource reservation protocol LSPs are placed in the same network domain as resource reservation protocol LSPs, the amount of reservable bandwidth for resource reservation protocol LSPs is reduced. As a transition solution, network operators may not want to have to expend resources modifying the resource reservation protocol executing on the routers 12 in the network. As such, it may be preferable for there to be no changes to the computation logic used by deployed resource reservation protocol path computation elements such that resources for configuration of resource reservation protocol LSPs are not unnecessarily upgraded when the upgrades are inevitably to be discarded.

When non-resource reservation protocol LSPs are placed in the same network domain as resource reservation protocol LSPs, inaccuracies may be introduced in the TED used by resource reservation protocol path computation elements, such as controller 30 or ingress router 12A. For example, when non-resource reservation protocol LSPs are provisioned, resource reservation protocol path computation elements computing resource reservation protocol paths may not account for non-resource reservation protocol LSP bandwidth utilization.

In accordance with the techniques of this disclosure, ingress router 12A may implement collect traffic flow statistics of non-resource reservation protocol LSPs (e.g., segment routing LSP 20 or LDP LSP 24) from each interface of ingress router 12A. For example, ingress router 12A may periodically (e.g., every 10 seconds, every minute, etc.) collect traffic flow statistics from an interface associated with link 18A, for which RSVP-TE LSPs 22 and segment routing LSP 20 and LDP LSP 24 are established. In some examples, ingress router 12A may use IP Flow Information Export (IPFIX) protocol, Simple Network Management Protocol (SNMP), or Extensible Markup Language (XML) based accounting to collect the traffic flow statistics of non-resource reservation protocol LSPs. Traffic flow statistics may indicate an amount of network traffic forwarded on a non-resource reservation protocol label switched path (LSP) (e.g., segment routing LSP 20) over the interface of ingress router 12A.

In some examples, system 10 may include a central controller 30, which centrally computes the paths for non-RSVP LSPs 20, 24 and RSVP-TE LSPs 22. Controller 30 may include a bandwidth subscription manager 80 for comparing traffic statistics on interfaces of ingress routers such as router 12A to a pre-defined threshold to trigger an adjustment of percentage of reservable bandwidth available for RSVP-TE LSP reservations on particular interfaces if traffic flow statistics from non-RSVP LSPs has met the threshold.

For example, bandwidth subscription manager 80 may receive a set of traffic flow statistics 32 from ingress router 12A, and computes an average from the set of traffic flow statistics (or the ingress router 12A may compute the average and send this to controller 30). Bandwidth subscription manager 80 may compare a pre-defined traffic adjust-threshold to the average and determine whether the average of traffic flow statistics of a non-RSVP LSP (e.g., segment routing LSP 20) has met the traffic adjust-threshold. If the threshold is met on an interface, bandwidth subscription manager 80 of controller 30 may send an adjustment instruction 34 instructing ingress router 12A to modify percentage of reservable bandwidth for RSVP-TE LSP reservations for corresponding interfaces of ingress router 12A. In response to detecting a change to the percentage of reservable bandwidth (which may be part of the TED), an IGP-TE module in turn sends an IGP-TE advertisement to its IGP peers (e.g., other routers 12 in network 14) advertising the adjusted reservable bandwidth for RSVP-TE LSP reservations on corresponding interfaces of ingress router 12A.

The reservable bandwidth and the available bandwidth configured on each interface of ingress router 12A for RSVP-TE reservations may be each be set at 100 percent by default. RSVP-TE LSP 22A may be established in network 14 in which ingress router 12A may reserve 10 percent of bandwidth for an interface associated with link 18A. In response, router 12A adjusts the remaining available bandwidth to 90 percent for RSVP-TE LSP reservations that may use the interface associated with link 18A. RSVP-TE LSP 22B may also be established in network 14 in which ingress router 12A reserves 10 percent of bandwidth from an interface associated with link 18A. As such, router 12A adjusts the remaining available bandwidth to 80 percent for RSVP-TE LSP reservations that may use the interface associated with link 18A. However, reservable bandwidth (the percentage of link bandwidth available for resource reservation protocol LSP reservations for a given interface) remains at 100% in this example, since all of the link's bandwidth can be used for RSVP LSPs.

In the example of FIG. 1, non-RSVP LSPs, e.g., segment routing LSP 20 and/or LDP LSP 24, may be established in network 14 to co-exist with RSVP-TE LSPs 22. For example, ingress router 12A may include an interface associated with link 18A for RSVP-TE LSPs 22, segment routing LSP 20, and LDP LSP 24.

In accordance with the techniques of this disclosure, ingress router 12A may periodically (e.g., every 10 seconds, every minute, etc.) collect traffic flow statistics for segment routing LSP 20 on each interface associated with link 18A. In one example, bandwidth subscription manager 80 of controller 30 may receive a set of the traffic flow statistics from ingress router 12A, including packet and byte statistics corresponding to traffic flow of segment routing LSP 20. Ingress router 12A may stream the traffic flow statistics at periodic intervals or continuously, for example. In some examples, ingress router 12A may compute a rolling average of the traffic statistics, and periodically send the average value to controller 30. In other examples, bandwidth subscription manager 80 on controller 30 may receive raw traffic statistics and may compute an average of segment routing LSP 20 traffic flow based on the collected set of traffic flow statistics for segment routing LSP 20. For example, bandwidth subscription manager 80 may compute an average of 20 percent bandwidth utilization by segment routing LSP 20.

Bandwidth subscription manager 80 may compare a pre-defined traffic adjust-threshold with the average of segment routing LSP 20 traffic flow. As one example, the pre-defined traffic adjust-threshold may establish an upper boundary of 15 percent bandwidth utilization. In response to determining that the 20 percent bandwidth utilization by segment routing LSP 20 has met a configured threshold for non-RSVP LSP bandwidth 15 percent, bandwidth subscription manager 80 may cause ingress router 12A to adjust percentage of reservable bandwidth for RSVP-TE LSP reservations for an interface of ingress router 12A associated with link 18A. For example, in response to determining that the average of traffic flow statistics for segment routing LSP has met the traffic adjust-threshold, bandwidth subscription manager 80 may configure an adjustment instruction 34 to ingress router 12A to update the TED with an adjusted percentage of reservable bandwidth (e.g., from 100 percent to 80 percent) available for RSVP-TE LSP reservations on the interface associated with link 18A. The adjustment of reservable bandwidth may in turn trigger ingress router 12A to output an IGP-TE advertisement to IGP-TE peers with the adjusted percentage of reservable bandwidth.

In some examples, the pre-defined traffic adjust-threshold may be defined as a percent change (increase or decrease) in an amount of non-RSVP LSP traffic for a link), and bandwidth subscription manager 80 is configured to, in response to determining that the amount of non-RSVP LSP traffic has changed by at least the pre-defined threshold percent, send an adjustment instruction to ingress router 12A to update the TED with an adjusted percentage of reservable bandwidth (e.g., decreasing or increasing the reservable bandwidth) available for RSVP-TE LSP reservations on the interface associated with link 18A.

In some examples, instead of relying on a central controller 30, each of routers 12 may include an "on-box" bandwidth subscription manager 80 that monitors traffic statistics relative to the traffic adjust-threshold and adjusts the reservable bandwidth. In this example, routers 12 may be configured to collect non-resource reservation protocol LSP traffic flow statistics for each of their respective interfaces, and compare the of traffic flow statistics for non-resource reservation protocol LSPs to a pre-defined traffic adjust-threshold. Each of routers 12 may be configured to monitor and determine when the traffic flow statistics for non-resource reservation LSPs is greater than the threshold such that each of routers 12 may adjust a percentage of reservable bandwidth allowed for resource reservation protocol LSP reservations on particular interfaces. In some examples, routers 12 already deployed in network 14 may be configured to add software logic for bandwidth subscription manager 80 by running a script, such as a commit script, to add this functionality to routers 12. In other examples, routers 12 may be configured to include software logic for bandwidth subscription manager 80 by performing a software upgrade to routers 12.

As such, when computing paths for resource reservation protocol LSPs, an ingress router may rely on TED information that accounts for non-resource reservation protocol LSP traffic flow statistics, such as bandwidth utilization. In this way, the computation logic is does not need to be changed when computing paths for resource reservation protocol LSPs that co-exist with non-resource reservation protocol LSPs. Requiring that a pre-defined traffic adjust-threshold must be met before updating the percentage of reservable bandwidth, rather than updating the percentage of reservable bandwidth every time that non-RSVP traffic changes, allows for more significant changes to be addressed without making changes just for minor traffic variations. As one example, the pre-defined threshold to trigger adjustment of reservable bandwidth may be 1%. As another example, the pre-defined threshold to trigger adjustment of reservable bandwidth may be 10%. As a further example, the pre-defined threshold to trigger adjustment of reservable bandwidth may be 20%. These values are merely examples, and other values may be used. Network administrators may configure the threshold value based on their network needs and sensitivity to non-resource reservation protocol traffic, and may change the threshold value as these needs change.

Figure 2:
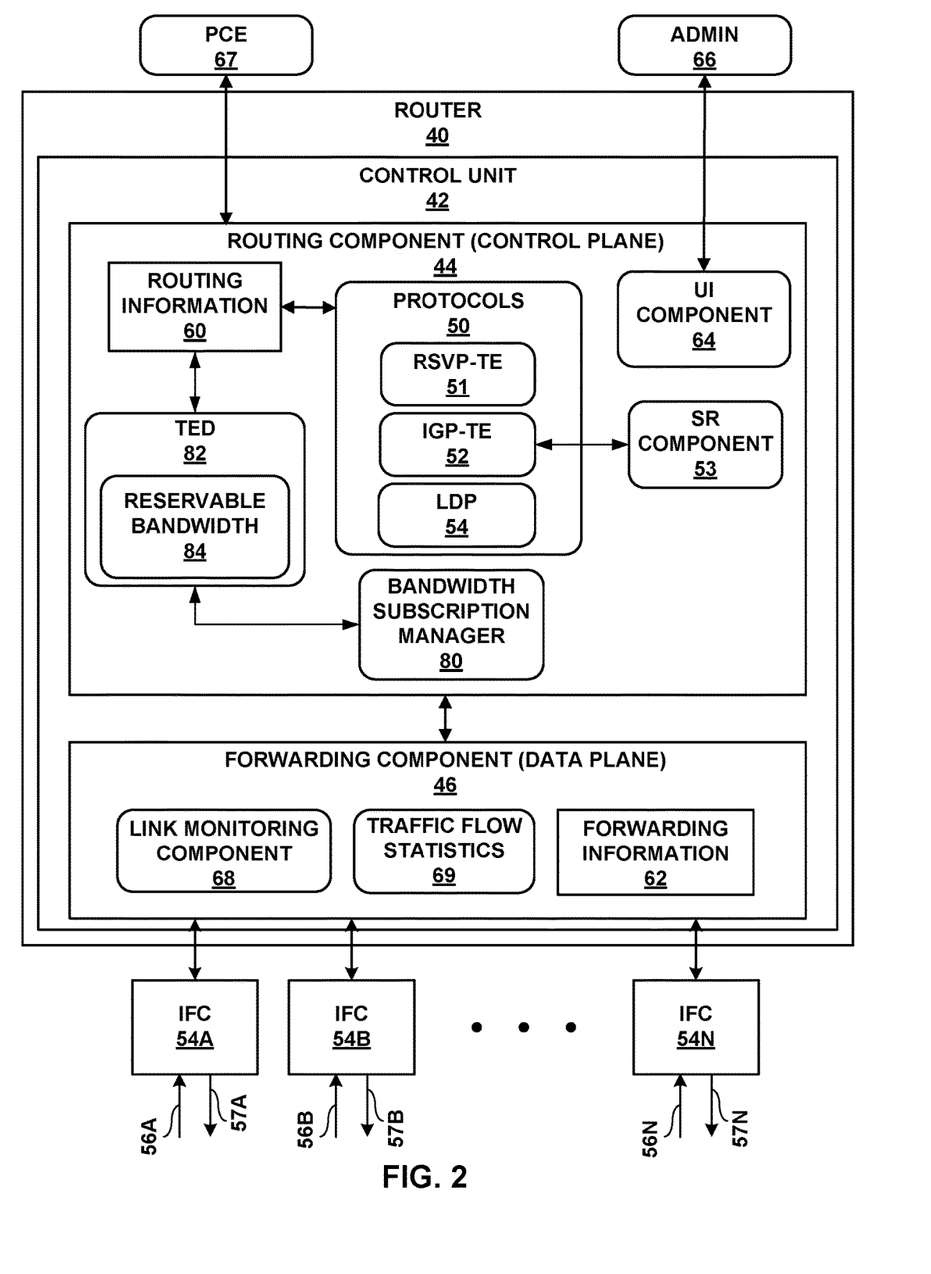
FIG. 2 is a block diagram illustrating an example router capable of operating in accordance with the techniques described herein.

FIG. 2 is a block diagram illustrating an example router 40 that performs various aspects of the techniques described in this disclosure. Router 40 may represent any of routers 12 of FIG. 1. In the example of FIG. 1, router 40 is described with respect to ingress router 12A. While described with respect to router 40, the techniques may be implemented by any other type of network device capable of implementing at least routing protocols including a resource reservation protocol, such as RSVP-TE, and a non-resource reservation protocol, such as segment routing or LDP. Thus, while described with respect to router 40, the techniques should not be limited to router 40 described with respect to the example of FIG. 2.

In the example of FIG. 2, router 40 includes interface cards 54A-54N ("IFCs 54") that receive and send data units, such as packet flows, via network links 56A-56N and 57A-57N, respectively. Router 40 may include a chassis (not shown) having a number of slots for receiving a set of cards, including IFCs 54. Each card may be inserted into a corresponding slot of the chassis for electrically coupling the card to routing component 44 via high-speed switch (not shown), which may comprise, for example, switch fabric, switchgear, a configurable network switch or hub, or other high-speed switching mechanisms. IFCs 54 may be coupled to network links 56A-56N and 57A-57N via a number of physical interface ports (not shown). Generally, IFCs 54 may each represent one or more network interfaces by which router 40 may interface with links of a network, such as links 18 as shown in the example of FIG. 1.

In general, router 40 may include a control unit 42 that determines routes of received packets and forwards the packets accordingly via IFCs 54. In the example of FIG. 2, control unit 38 includes routing component 44 (control plane) that configures and controls packet forwarding operations applied by packet forwarding component 46 (data plane).

Routing component 44 provides an operating environment for various routing protocols 50 that execute at different layers of a network stack. Routing component 44 is responsible for the maintenance of routing information 60 to reflect the current topology of a network and other network entities to which router 40 is connected. In particular, routing protocols periodically update routing information 60 to accurately reflect the topology of the network and other entities based on routing protocol messages received by router 40. The protocols may be software processes executing on one or more processors. For example, routing component 44 includes network protocols that operate at a network layer of the network stack, which are typically implemented as executable software instructions.

In the example of FIG. 2, protocols 50 may include a RSVP-TE component 51 to implement Resource Reservation Protocol with Traffic Extensions (RSVP-TE) protocol to establish RSVP-TE LSPs (e.g., RSVP-TE LSPs 22). For example, RSVP-TE component 51 may implement RSVP-TE protocol to generate and send Path and Resv messages for establishing LSPs. Upon router 40 receiving a Path message from a neighboring router, router 40 allocates MPLS labels used for establishing the LSPs based on the per-interface LSP adjustment of reservable bandwidth. As described below, router 40 may advertise new Resv messages with an adjusted percentage of reservable bandwidth.

Protocols 50 may also include an IGP-TE component 52 to implement an IGP protocol with traffic engineering extensions to exchange link state information, and facilitate forwarding of packets or other data units between endpoint devices. In some examples, IGP-TE component 52 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. In some examples, IGP-TE component 52 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety.

In some examples, routing component 44 includes a segment routing (SR) component 52 to implement segment routing techniques for IGP protocols (e.g., IS-IS and OSPF) for specifying how router 40 may advertise adjacency labels. These adjacency labels may steer a packet through a controlled set of instructions, called segments, by prepending the packet with a segment routing header.

In some examples, routing component 44 may include other non-resource reservation protocols in addition to or instead of segment routing, such as other MPLS protocols (e.g., LDP). For example, protocols 50 may also include LDP component 54 to implement LDP protocol to distribute labels to support MPLS forwarding along routed paths. Examples of LDP protocol are described in RFC 3036, by L. Andersson et al., entitled "LDP Specification," dated October 2007, which is incorporated by reference in its entirety. Protocols 50 may include other routing protocols (not shown), such as routing information protocol (RIP), border gateway protocol (BGP), or other network protocols.

By executing the routing protocols, routing component 44 identifies existing routes through the network and determines new routes through the network. Routing component 44 stores routing information 60 that includes, for example, known routes through the network. Forwarding component 46 stores forwarding information 62 that includes destinations of output links 57. Forwarding information 62 may be generated in accordance with routing information 60.

Forwarding component 46 may include a link monitoring component 68 for tracking traffic flow of non-resource reservation protocol LSPs, e.g., segment routing LSP 20. Link monitoring component 68 maintains traffic flow statistics 69, which include information such as the number of packets, the number of bytes received or the like. For example, router 40 may implement IPFIX, SNMP, or XML, based accounting to collect traffic from network links 56A-56N. The traffic may include label fields that enable link monitoring component 68 to monitor traffic flow statistics 69 for non-resource reservation protocol LSPs.

In some examples, link monitoring component 68 may periodically collect traffic flow statistics 69, e.g., every 10 seconds, every minute, etc. In some examples, link monitoring component 68 may collect traffic flow statistics 69 of a non-resource reservation protocol LSP from each interface (e.g., input links 56) of router 40 associated with the links implementing at least a resource reservation protocol LSP and a non-resource reservation protocol LSP.

Routing component 44 may include a Traffic Engineering Database (TED) 82 for storing e.g., path information for resource reservation protocol LSPs and non-resource reservation protocol LSPs. In some examples, TED 82 may include reservable bandwidth data 84 that indicates the percentage of reservable bandwidth for resource reservation protocol LSPs for each interface of router 40. As described below, when computing paths for resource reservation LSPs, router 40 may rely on updated TED information to provide an adjusted percentage of reservable bandwidth available for resource reservation protocol LSPs per interface. TED 82 may be in the form of a variety of data structures, such as a number of tables, link lists, radix trees, databases, flat files, or other data structures.

In accordance with some example aspects of the techniques of this disclosure, routing component 44 may include a bandwidth subscription manager 80 to trigger an adjustment of reservable bandwidth available for a corresponding interface of router 40. In the example of FIG. 2, bandwidth subscription manager 80 may compute an average of the collected traffic flow statistics 69 forwarded from forwarding component 46. Bandwidth subscription manager 80 may calculate an average of the collected traffic flow statistics 69 over a period of collected samples. In some examples, the bandwidth subscription manager 80 is a part of the router (as shown in FIG. 2), while in other examples, the bandwidth subscription manager 80 may be in a controller separate from the router (as shown in FIG. 1), such as in PCE 67 of FIG. 2. In some cases, a path computation element (PCE) 67 may alternatively or additionally provide configuration information to router 40, e.g., may compute LSP paths and provide them to router 40.

Bandwidth subscription manager 80 may monitor the average of collected traffic flow statistics via a pre-defined traffic adjust-threshold and trigger an adjustment to a percentage of reservable bandwidth if the average of non-resource reservation protocol LSP traffic has met the traffic adjust-threshold. The pre-defined traffic adjust-threshold may be pre-defined by a network administrator (admin 66) via user interface (UI) component 64 included within control unit 42. The network administrator 66 may set the pre-defined traffic adjust-threshold via UI component 64. In some examples, the traffic adjust-threshold may be defined as a percent change (increase or decrease) in total amount of non-RSVP LSP traffic for a link (that is, adjustment is made if the amount of non-RSVP LSP traffic has changed by the pre-defined percent since, e.g., the last adjustment). In other examples, the traffic adjust-threshold may be defined as an amount of non-RSVP LSP traffic as an absolute percent of total LSP traffic for a link (that is, adjustment is made if the amount of non-RSVP LSP traffic has met the pre-defined percentage of total LSP traffic).

Bandwidth subscription manager 80 may compare the average of non-resource reservation protocol LSP traffic with the traffic adjust-threshold. Bandwidth subscription manager 80 may determine whether the average of non-resource reservation protocol LSP traffic has met the traffic adjust-threshold. If the average has met the threshold, bandwidth subscription manager 80 may trigger an update to the reservable bandwidth data 84 to reflect the actual bandwidth utilization of the non-resource reservation protocol LSPs. In this way, router 40 may rely on the updated TED information to provide resource reservation protocol reservations with an adjusted percentage of reservable bandwidth. In one example, router 40 distributes the labels and reserves bandwidth on links according to the reservable bandwidth percentage adjustment. For example, router 40 may use RSVP-TE 51 to generate new Resv messages based on the reservable bandwidth percentage information in reservable bandwidth data 84. Where the packet flows are assigned to be forwarded on a RSVP-TE LSP, bandwidth subscription manager 80 may provide output links 57 with the proper bandwidth allocation based on any adjustment by bandwidth subscription manager 80.

In response to detecting a change to subscription data of TED 82, IGP-TE component 52 may automatically output to IGP peer routers an IGP-TE advertisement with the adjusted percentage of reservable bandwidth, which in turn causes the IGP peer routers to update their respective TEDs.

Although described for purposes of example with respect to a router, router 40 may be more generally a network device having routing functionality, and need not necessarily be a dedicated routing device. The architecture of router 40 illustrated in FIG. 2 is shown for example purposes only. The techniques of this disclosure are not limited to this architecture. In other examples, router 40 may be configured in a variety of ways. In one example, some of the functionally of control unit 42 may be distributed within IFCs 54. In another example, control unit 42 may comprise a plurality of packet forwarding engines operated as slave routers.

Control unit 42 may be implemented solely in software, or hardware, or may be implemented as a combination of software, hardware, or firmware. For example, control unit 42 may include one or more processors that execute program code in the form of software instructions. In that case, the various software components/modules of control unit 42 may comprise executable instructions stored on a computer-readable storage medium, such as computer memory or hard disk.

Figure 3:
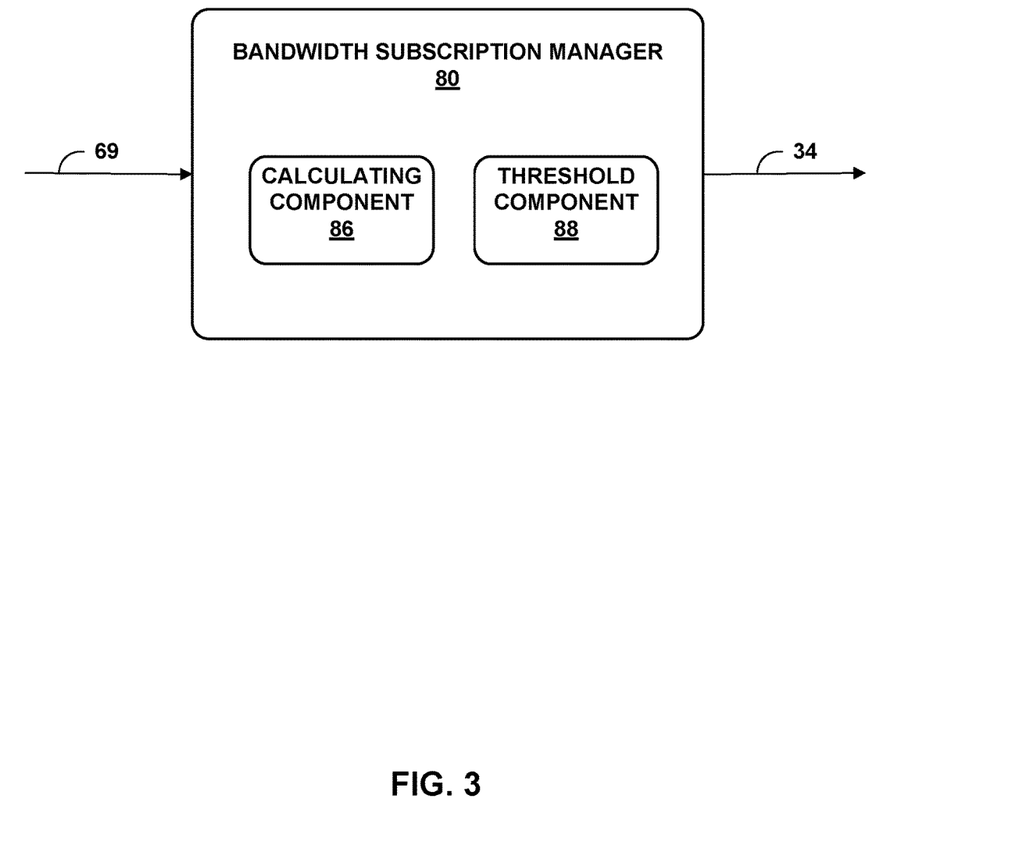
FIG. 3 is a block diagram illustrating an example bandwidth subscription manager in further detail.

FIG. 3 is a block diagram illustrating an example of bandwidth subscription manager 80 in further detail. In some examples, bandwidth subscription manager 80 may be located in any of routers 12 of FIG. 1. For example, a network administrator may add scripts to configure ingress router 12A to include bandwidth subscription manager 80. Alternatively, a network administrator may upgrade the software of ingress router 12A to include bandwidth subscription manager 80. In some examples, bandwidth subscription manager 80 may be located external to routers 12 in an off-the-box controller 30 (FIG. 1). For example, a network administrator may add scripts or upgrade the software of controller 30 to include the bandwidth subscription manager.

As shown in FIG. 3, the bandwidth subscription manager 80 may receive a set of per-interface traffic flow statistics 69 (e.g., packet and byte statistics) collected from a link monitoring component 68 of an ingress router, e.g., router 40. Bandwidth subscription manager 80 may include a calculating component 86 to compute an average from the set of traffic flow statistics 69 over a period of samples such that bandwidth subscription manager 80 may monitor substantive changes in shared bandwidth utilization rather than a single event of bandwidth use.

Bandwidth subscription manager 80 may include a threshold component 88 for comparing a pre-defined traffic adjust-threshold to the average from the set of traffic flow statistics 69. As one example, a network administrator may pre-define a traffic adjust-threshold value of 15 percent bandwidth utilization via UI component 64. The network administrator may set the pre-defined traffic adjust-threshold to threshold component 88 such that bandwidth subscription manager 80 may compare the pre-defined traffic adjust-threshold value of 15 percent bandwidth utilization to the computed average of traffic flow statistics 69. If the average of traffic flow statistics for a non-resource reservation protocol LSP reflects a 20 percent change, bandwidth subscription manager 80 may configure an adjustment instruction 34 to update reservable bandwidth data 84 in TED 82 to include an adjusted percentage of reservable bandwidth (e.g., decreasing from 100 percent to 80 percent) for resource reservation protocol LSP reservations on the interface associated with the non-resource reservation protocol LSP. In response, RSVP-TE 51 of router 40 may generate new Resv messages with the adjusted percentage of reservable bandwidth.

As another example, assume the traffic adjust-threshold value is defined as a 10% change in total amount of non-RSVP LSP traffic for a link (that is, adjustment is made if the amount of non-RSVP LSP traffic has changed by the pre-defined percent since the last adjustment). In this example, assume there is no RSVP traffic initially so initial RSVP reservable bandwidth subscription is 100%. When the amount of non-RSVP LSP traffic is measured during a first adjustment interval, assume the amount of non-RSVP LSP traffic is measured at 12% so bandwidth subscription manager 80 reduces the reservable bandwidth to 88%. Assume there is subsequently RSVP traffic of 20% subscription, reducing the reservable bandwidth to 80%, and non-RSVP LSP traffic (e.g., segment routing LSP) is measured as having a 20% change since the last adjustment, so bandwidth subscription manager 80 reduces the reservable bandwidth to 60%. In this example, if segment routing LSP utilization later drops by 10% (crosses the 10% threshold upwards), bandwidth subscription manager 80 further adjusts the reservable bandwidth from 60% to 70%.

In some examples, when resource reservation protocol preemption is configured on router 40 such that resource reservation protocol sessions may be preempted by higher-priority sessions (either by hard or soft preemption), higher-priority non-resource reservation protocol LSPs such as segment routing LSPs will naturally take priority as they are established in the network. In some examples, bandwidth subscription manager 80 may be configured such that if resource reservation protocol session preemption is not being applied on router 40 (e.g., a default resource reservation protocol preemption setting has been disabled), bandwidth subscription manager 80 will not reduce percentage of reservable bandwidth below reserved resource reservation protocol LSP bandwidth. In some cases, bandwidth subscription manager 80 may reduce the percentage of reservable bandwidth on an interface up to the reserved resource reservation protocol LSP bandwidth, but will not go below the reserved bandwidth when resource reservation protocol preemption is not in force. In the case of bandwidth subscription manager 80 in a central controller 30, controller 30 may reroute the non-resource reservation protocol (e.g., segment routing LSP) traffic to a different path if the non-resource reservation protocol LSP request cannot be accommodated due to the current resource reservation protocol LSPs being in place.

In some examples, segment routing LSPs is set to a higher priority than RSVP-TE LSPs. A network administrator 66 may disable RSVP-TE LSP preemption via UI component 64. As bandwidth subscription manager 80 determines that the average of segment routing LSP bandwidth utilization has met the traffic adjust-threshold, bandwidth subscription manager 80 will not adjust the percentage of reservable bandwidth below the reserved bandwidth since RSVP-TE preemption is not in force. In examples where the bandwidth subscription manager 80 is in a central controller 30, controller 30 may reroute the segment routing LSP traffic to a different path, e.g., link 18B, if the segment routing LSP request cannot be accommodated due to the current resource reservation protocol LSPs being in place.

Figure 4:
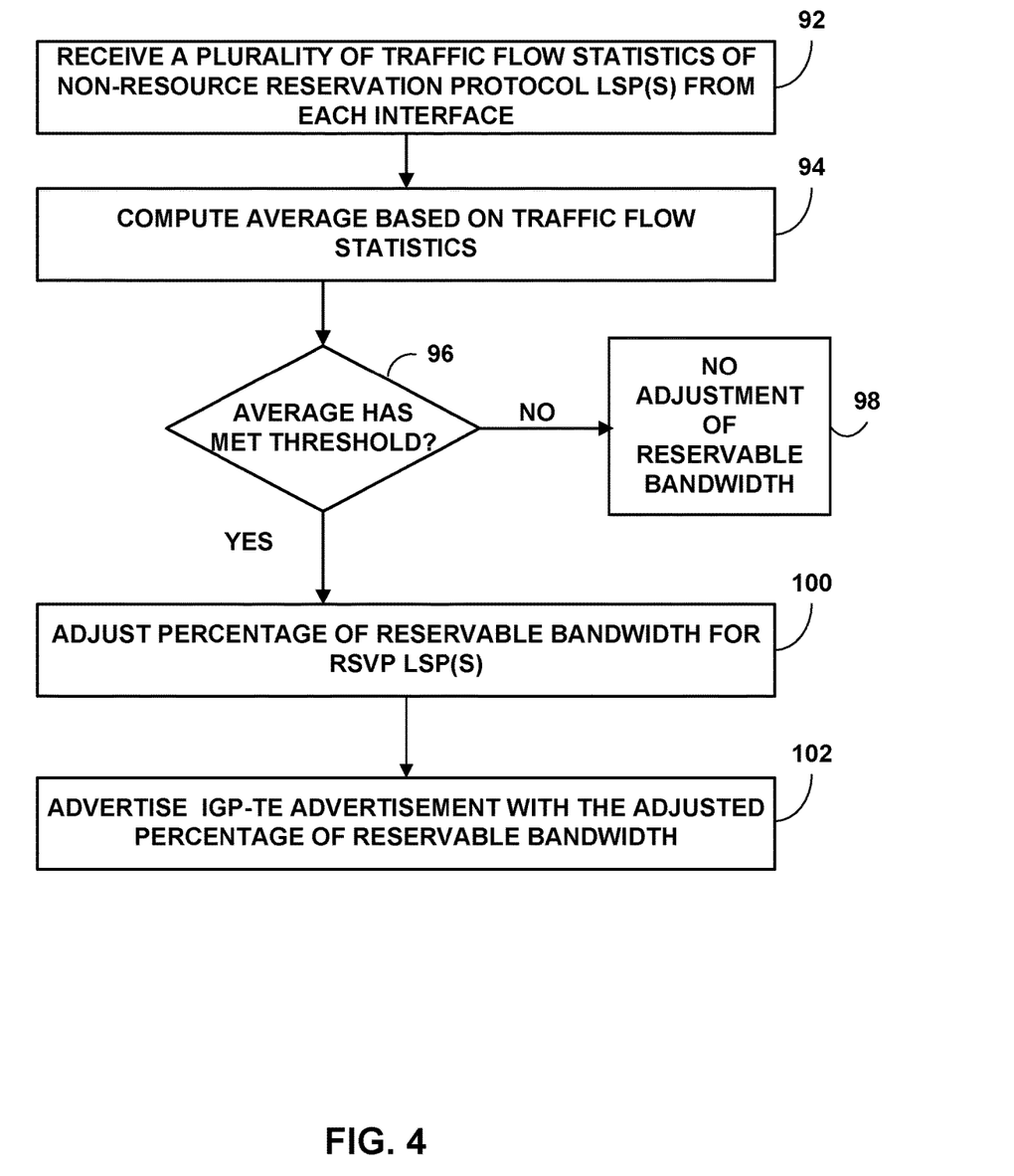
FIG. 4 is a flowchart illustrating an example operation of a router in establishing bandwidth sharing for resource reservation protocol LSP and segment routing protocol LSP, in accordance with the techniques of this disclosure.

FIG. 4 is a flowchart illustrating an example operation of a bandwidth subscription manager in establishing bandwidth sharing for resource reservation protocol LSPs and non-resource reservation protocol LSPs, in accordance with the techniques of this disclosure. FIG. 4 will be explained with reference to bandwidth subscription manager 80 of FIGS. 1 and 2. In the example of FIG. 4, bandwidth subscription manager may receive traffic flow statistics of non-resource reservation protocol LSPs from each interface of ingress router 12A (92). As one example, a network administrator may configure an ingress router 12A to periodically collect an amount of network traffic, e.g., packet and byte statistics, forwarded on a non-resource reservation protocol LSP, e.g., segment routing LSP 20 and/or LDP LSP 24, over an interface (e.g., IFCs 54) associated with link 18A, which establishes RSVP-TE LSPs 22, segment routing LSP 20, and LDP LSP 24. In some examples, forwarding component 46 of ingress router 12A may forward the traffic flow statistics to routing component 44 that includes bandwidth subscription manager 80. In some examples, ingress router 12A may forward the traffic flow statistics to bandwidth subscription manager 80 located in an off-the-box controller (e.g., controller 30 of FIG. 1).

Bandwidth subscription manager 80 may compute an average based on the traffic flow statistics of non-resource reservation protocol LSP(s) (94). In one example, bandwidth subscription manager 80 may calculate an average of segment routing LSP 20 traffic flow statistics over a period of samples collected such that bandwidth subscription manager 80 may monitor actual changes in shared bandwidth utilization rather than a single event of bandwidth use.

Bandwidth subscription manager 80 may determine whether the average has met a pre-defined traffic adjust-threshold (96). In some examples, a network administrator may pre-configure a traffic adjust-threshold to monitor non-resource reservation protocol LSP traffic flow statistics. The network administrator may set the pre-defined traffic adjust-threshold for bandwidth subscription manager 80 to compare the average of traffic flow statistics with the traffic adjust-threshold such that when the average of traffic flow statistics has met the traffic adjust-threshold, bandwidth subscription manager 80 may update the TED with an adjusted percentage of reservable bandwidth for an interface of ingress router 12A.

As one example, RSVP-TE LSPs 22 and segment routing LSP 20 may share link 18A such that the reservable bandwidth for the interface associated with link 18A is changed. As segment routing LSP 20 utilizes more bandwidth, the percentage of reservable bandwidth for RSVP-TE LSP reservations is reduced. Bandwidth subscription manager 80 may determine via the traffic adjust-threshold whether an adjustment to the reservable bandwidth is needed. For example, if the average of traffic flow statistics does not meet the traffic adjust-threshold, no adjustment to the percentage of reservable bandwidth is made (98). In contrast, if the average of traffic flow statistics has met the traffic adjust-threshold, bandwidth subscription manager 80 may adjust the percentage of reservable bandwidth for the interface of the ingress router. For example, bandwidth subscription manager 80 may update the TED with reservable bandwidth data 84 to reflect an adjusted percentage of reservable bandwidth for RSVP-TE LSP reservations for a corresponding interface of ingress router 12A. As such, bandwidth subscription manager 80 may trigger an adjustment of reservable bandwidth for RSVP-TE LSP reservations on the corresponding interface of ingress router 12A based on traffic flow statistics of non-resource reservation protocol LSPs (100).

In response, bandwidth subscription manager 80 may advertise an IGP-TE advertisement with the adjusted percentage of reservable bandwidth (104). In this way, the IGP-TE advertisement may provide an updated percentage of reservable bandwidth for a path computation element (e.g., path computation element 67) without configuring the computation logic.

In some examples, the network device may be configured with LSP preemption. In some examples, in response to determining that pre-emption of resource reservation protocol LSPs is disabled, bandwidth subscription manager 80 may only adjust the percentage of reservable bandwidth if the adjusted percentage of reservable bandwidth is not below an amount of bandwidth already reserved by one or more resource reservation protocol LSPs on the interface.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
   comparing, by a network device and to a pre-defined threshold, traffic flow statistics indicating an amount of network traffic forwarded on a non-resource reservation protocol label switched path (LSP) over an interface of an ingress network device to the non-resource reservation protocol LSP, wherein the non-resource reservation protocol LSP is a label switched path established from the ingress network device to an egress network device using a label-switching protocol without requesting reservation of resources; and
   in response to determining the amount of network traffic has met the pre-defined threshold for the interface, automatically adjusting, by the network device and based on the amount of network traffic forwarded on the non-resource reservation protocol LSP, a percentage of reservable bandwidth available for resource reservation protocol LSP reservations for the interface of the ingress network device.

2. The method of claim 1, wherein the non-resource reservation protocol LSP comprises a Segment Routing (SR) LSP.

3. The method of claim 1, wherein the non-resource reservation protocol LSP comprises a Label Distribution Protocol (LDP) LSP.

4. The method of claim 1, wherein the non-resource reservation protocol LSP comprises a Border Gateway Protocol Labeled Unicast (BGP-LU) LSP.

5. The method of claim 1, wherein the resource reservation protocol LSP comprises a Resource Reservation Protocol with Traffic Engineering extensions (RSVP-TE) LSP.

6. The method of claim 5, wherein the ingress network device is an ingress network device to at least one RSVP-TE LSP for which bandwidth is reserved on the interface.

7. The method of claim 1, further comprising:
   computing, by the network device, an average based on the traffic flow statistics; and
   determining, by the network device, whether the average has met the pre-defined threshold.

8. The method of claim 1, wherein the ingress network device comprises the network device.

9. The method of claim 1, wherein the ingress network device comprises a centralized controller separate from the ingress router, wherein the centralized controller computes paths for the resource reservation protocol LSP and the non-resource reservation protocol LSP.

10. The method of claim 1, wherein adjusting the percentage of reservable bandwidth comprises:
    updating a Traffic Engineering Database (TED) of the ingress network device with the adjusted percentage of reservable bandwidth for resource reservation protocol LSP reservations.

11. The method of claim 1, wherein adjusting the percentage of reservable bandwidth comprises:
    in response to determining that pre-emption of resource reservation protocol LSPs is disabled, only adjusting the percentage of reservable bandwidth if the adjusted percentage of reservable bandwidth is not below an amount of bandwidth already reserved by one or more resource reservation protocol LSPs on the interface.

12. The method of claim 1, wherein the pre-defined threshold is defined as a percent change in an amount of non-RSVP LSP traffic over the interface, the method further comprising:
    determining that a change in the amount of network traffic has met the pre-defined threshold percent change,
    wherein automatically adjusting comprises automatically adjusting the percentage of reservable bandwidth in response to determining that the change in the amount of network traffic has met the pre-defined threshold percent change.

13. A router comprising:
    at least one processor coupled to a memory, wherein the processor executes software configured to:
    compare, to a pre-defined threshold, traffic flow statistics indicating an amount of network traffic forwarded on a non-resource reservation protocol label switched path (LSP) over an interface of the router to the non-resource reservation protocol LSP, wherein the non-resource reservation protocol LSP is a label switched path established from the router as an ingress network device to an egress network device using a label-switching protocol without requesting reservation of resources; and
    in response to determining the amount of network traffic has met the pre-defined threshold for the interface, automatically adjust a percentage of reservable bandwidth available for resource reservation protocol LSP reservations for the interface of the router, wherein the percentage of reservable bandwidth is adjusted based on the amount of network traffic forwarded on the non-resource reservation protocol LSP.

14. The router of claim 13, wherein the non-resource reservation protocol LSP comprises a Segment Routing (SR) LSP.

15. The router of claim 13, wherein the non-resource reservation protocol LSP comprises a Label Distribution Protocol (LDP) LSP.

16. The router of claim 13, wherein the resource reservation protocol LSP comprises a Resource Reservation Protocol with Traffic Engineering extensions (RSVP-TE) LSP.

17. The router of claim 16, wherein the router is the ingress network device to at least one RSVP-TE LSP for which bandwidth is reserved on the interface.

18. The router of claim 13, further comprising software configured to:
compute an average based on the traffic flow statistics; and
determine whether the average has met the pre-defined threshold.

19. The router of claim 13, wherein the software configured to adjust the percentage of reservable bandwidth comprises software configured to:
update a Traffic Engineering Database (TED) of the router with the adjusted percentage of reservable bandwidth for resource reservation protocol LSP reservations.

20. The router of claim 13, wherein the software configured to adjust the percentage of reservable bandwidth comprises software configured to:
in response to determining that pre-emption of resource reservation protocol LSPs is disabled, only adjust the percentage of reservable bandwidth if the adjusted percentage of reservable bandwidth is not below an amount of bandwidth already reserved by one or more resource reservation protocol LSPs on the interface.

21. A controller comprising:
at least one processor coupled to a memory, wherein the processor executes software configured to:
compare, to a pre-defined threshold, traffic flow statistics indicating an amount of network traffic forwarded on a non-resource reservation protocol label switched path (LSP) over an interface of an ingress network device to the non-resource reservation protocol LSP, wherein the non-resource reservation protocol LSP is a label switched path established from the ingress network device to an egress network device using a label-switching protocol without requesting reservation of resources; and
in response to determining the amount of network traffic has met the pre-defined threshold for the interface, automatically adjust a percentage of reservable bandwidth available for resource reservation protocol LSP reservations for the interface of the ingress network device, wherein the percentage of reservable bandwidth is adjusted based on the amount of network traffic forwarded on the non-resource reservation protocol LSP.

22. The controller of claim 21, wherein the non-resource reservation protocol LSP comprises a Segment Routing (SR) LSP.

23. The controller of claim 21, wherein the non-resource reservation protocol LSP comprises a Label Distribution Protocol (LDP) LSP.

24. The controller of claim 21, wherein the resource reservation protocol LSP comprises a Resource Reservation Protocol with Traffic Engineering extension (RSVP-TE) LSP.

25. The controller of claim 21, further comprising software configured to:
compute an average based on the traffic flow statistics; and
determine whether the average has met the pre-defined threshold.

26. The controller of claim 21, wherein the software configured to adjust the percentage of reservable bandwidth comprises software configured to:
update a Traffic Engineering Database (TED) of the ingress network device with the adjusted percentage of reservable bandwidth for resource reservation protocol LSP reservations.

27. The controller of claim 21, wherein the software configured to adjust the percentage of reservable bandwidth comprises software configured to:
in response to determining that pre-emption of resource reservation protocol LSPs is disabled, only adjust the percentage of reservable bandwidth if the adjusted percentage of reservable bandwidth is not below an amount of bandwidth already reserved by one or more resource reservation protocol LSPs on the interface.

28. A non-transitory computer-readable medium comprising instructions for causing at least one programmable processor of a network device to:
compare, to a pre-defined threshold, traffic flow statistics indicating an amount of network traffic forwarded on a non-resource reservation protocol label switched path (LSP) over an interface of an ingress network device to the non-resource reservation protocol LSP, wherein the non-resource reservation protocol LSP is a label switched path established from the ingress network device to an egress network device using a label-switching protocol without requesting reservation of resources; and
in response to determining the amount of network traffic has met the pre-defined threshold for the interface, automatically adjust a percentage of reservable bandwidth available for resource reservation protocol LSP reservations for the interface of the ingress network device, wherein the percentage of reservable bandwidth is based on the amount of network traffic forwarded on the non-resource reservation protocol LSP.

* * * * *